(12) United States Patent
Liu

(10) Patent No.: US 10,208,472 B1
(45) Date of Patent: Feb. 19, 2019

(54) OUTER WALL OF A BUILDING

(71) Applicant: Yueh-Ming Liu, Taichung (TW)

(72) Inventor: Yueh-Ming Liu, Taichung (TW)

( * ) Notice: Subject to any disclaimer, the term of this patent is extended or adjusted under 35 U.S.C. 154(b) by 0 days.

(21) Appl. No.: 15/854,123

(22) Filed: Dec. 26, 2017

(51) Int. Cl.
*E04B 1/14* (2006.01)
*E04C 2/24* (2006.01)
*E04B 1/38* (2006.01)
*E04B 1/04* (2006.01)
*E04B 2/86* (2006.01)
*E04G 9/06* (2006.01)

(52) U.S. Cl.
CPC ............. *E04B 1/14* (2013.01); *E04B 1/043* (2013.01); *E04B 1/383* (2013.01); *E04C 2/243* (2013.01); *E04B 2/86* (2013.01); *E04G 9/06* (2013.01)

(58) Field of Classification Search
CPC ............. E04B 1/383; E04B 1/043; E04B 1/14
See application file for complete search history.

(56) References Cited

U.S. PATENT DOCUMENTS

| | | | | |
|---|---|---|---|---|
| 3,693,304 A * | 9/1972 | Shell | ............... | E04B 1/08 52/204.1 |
| 4,288,962 A * | 9/1981 | Kavanaugh | ............... | E04B 2/562 52/220.1 |
| 4,653,243 A * | 3/1987 | Burkett | ............... | C04B 26/04 427/244 |
| 4,813,193 A * | 3/1989 | Altizer | ............... | E04B 1/14 52/210 |
| 5,647,180 A * | 7/1997 | Billings | ............... | E04B 1/942 52/268 |
| 2006/0191232 A1* | 8/2006 | Salazar | ............... | E04B 5/043 52/606 |
| 2006/0252645 A1* | 11/2006 | Oda | ............... | B41M 5/3375 503/209 |
| 2009/0004459 A1* | 1/2009 | Kipp | ............... | C04B 28/26 428/318.4 |
| 2011/0268916 A1* | 11/2011 | Pardue, Jr. | ............... | B32B 3/12 428/116 |
| 2012/0186165 A1* | 7/2012 | Wilsey | ............... | E04B 1/161 52/63 |
| 2012/0192516 A1* | 8/2012 | Hillers | ............... | E04B 1/14 52/309.4 |
| 2013/0305643 A1* | 11/2013 | Singleton | ............... | E04C 2/284 52/309.8 |

\* cited by examiner

*Primary Examiner* — Paola Agudelo
(74) *Attorney, Agent, or Firm* — Alan D. Kamrath; Kamrath IP Lawfirm, P.A.

(57) ABSTRACT

An outer wall of a building has a frame and a coating layer. The frame has multiple surfaces. The coating layer is coated on at least one of the surfaces of the frame and is composed of a glass-fiber net and an adhesive material layer. The adhesive material layer is composed of acrylic resin, Hydroxyethyl Cellulose (HEC), and water.

5 Claims, 5 Drawing Sheets

OUTER WALL OF A BUILDING

BACKGROUND OF THE INVENTION

1. Field of the Invention

The present invention relates to an outer wall and, more particularly, to an outer wall of a building.

2. Description of Related Art

The conventional outer wall of a building may be made of wood, metal, reinforced concrete (RC) or glass curtain. However, the conventional outer wall of a building has the following disadvantages.

1. The conventional metal, RC or glass curtain outer wall has a heavy weight, so the load of the building is increased due to the heavy outer wall. Therefore, the sizes of the steel used in the building have to be enlarged to support the heavy load, such that the cost for building a building will be increased. The machines for constructing the building are easily damaged, causing danger during the building process.

2. The conventional metal, RC or glass curtain outer wall easily absorbs heat or allows heat to be transferred to the inside of the building, so more air-conditioning power is needed to dissipate the heat.

3. The cost for the metal, RC or glass curtain outer wall is high, and the production and the transportation of the conventional outer wall will generate carbon dioxide ($CO_2$), so the cost for building a building will be increased.

In addition, a baffle having a light weight is provided and comprises a body composed of light-gauge steels and a calcium silicate board. However, the calcium silicate board is easily deformed due to water, so the weatherability and earthquake-resistant properties of the conventional baffle are not sufficient. When earthquakes occur, the conventional baffle is easily broken or damaged. Therefore, the conventional baffle cannot be applied to an outer wall of a building.

To overcome the shortcomings, the present invention provides an outer wall for a building to mitigate or obviate the aforementioned problems.

SUMMARY OF THE INVENTION

The main objective of the invention is to provide an outer wall for a building that has a reduced weight and a reduced manufacturing cost and can reduce the amount of carbon dioxide emission during production and transportation.

The outer wall has a frame and a coating layer. The frame has multiple surfaces. The coating layer is coated on at least one of the surfaces of the frame and is composed of a glass-fiber net and an adhesive material layer. The adhesive material layer is composed of acrylic resin, Hydroxyethyl Cellulose (HEC), and water.

Other objectives, advantages and novel features of the invention will become more apparent from the following detailed description when taken in conjunction with the accompanying drawings.

DETAILED DESCRIPTION OF PREFERRED EMBODIMENTS

Figure 1:
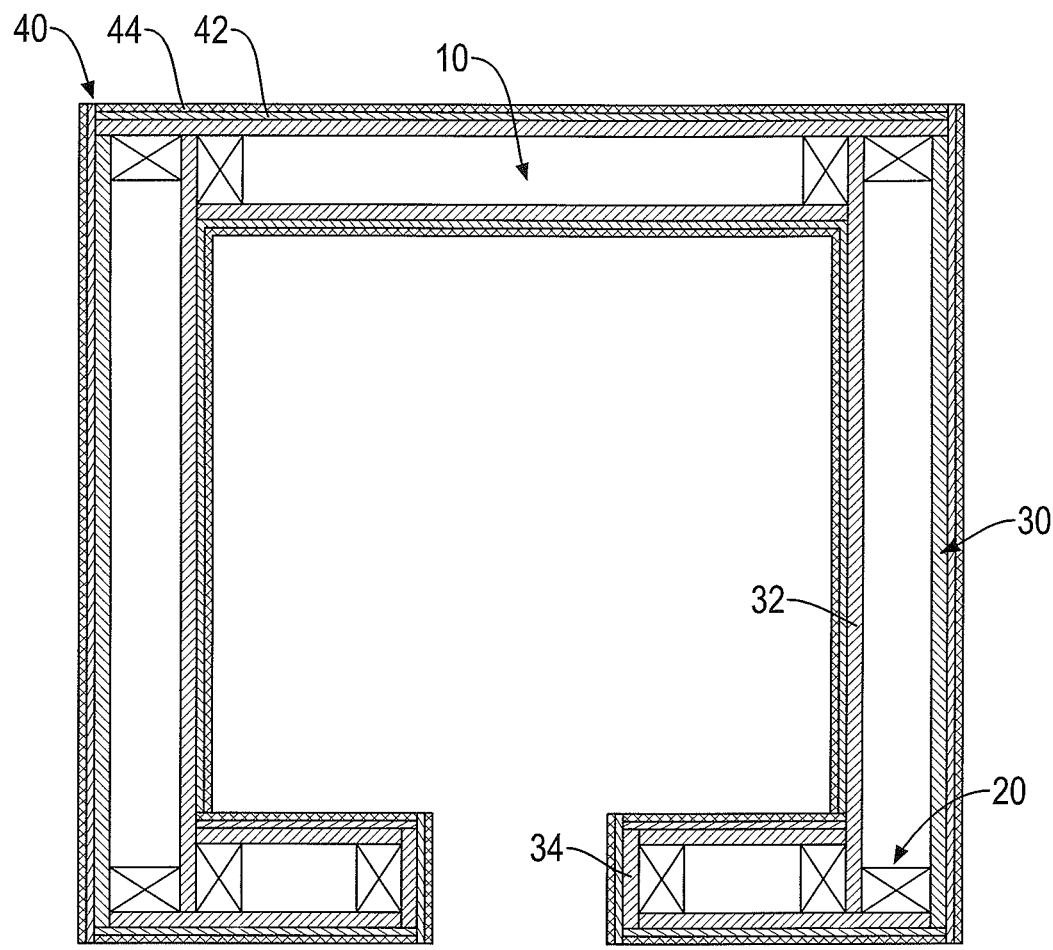
FIG. 1 is a cross sectional side view of a first embodiment of an outer wall of a building in accordance with the present invention.
Figure 2:
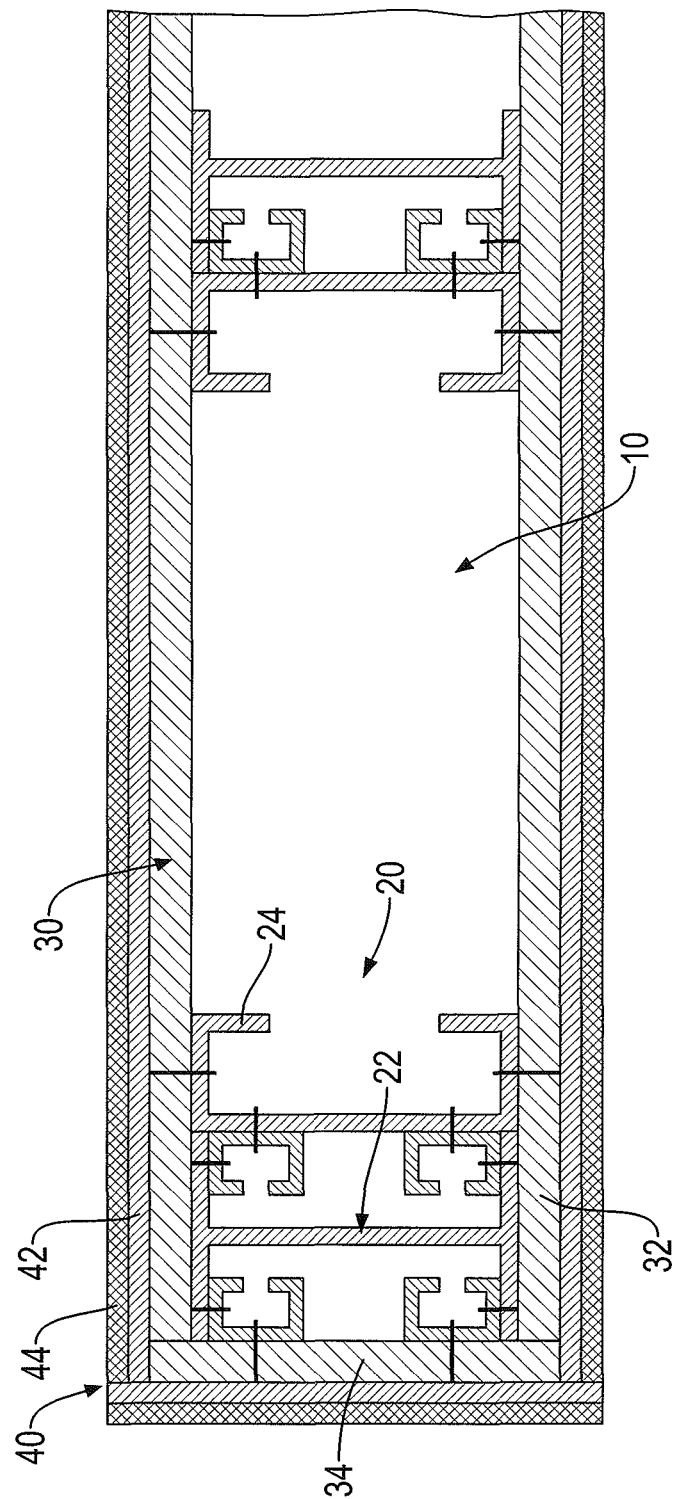
FIG. 2 is an enlarged cross sectional view of the outer wall in FIG. 1.

With reference to FIGS. 1 and 2, an outer wall in accordance with the present invention comprises a frame 10 and a coating layer 40.

The frame 10 comprises multiple metal members 20 to form an outer wall surface and an inner wall surface. Each metal member 20 comprises a steel member 22 and multiple metal rods 24. The steel member 22 may be H-shaped steel and is applied to be connected with or fixed on a body of a building. Alternatively, the steel member 22 may be a part of the body of the building. The metal rods 24 are mounted securely on the steel member 22 and may be C-shaped aluminum protrusions or iron protrusions.

The frame 10 further has an outer board 30 mounted on the outer wall surface and an inner board 32 mounted on the inner wall surface. Preferably, the outer board 30 and the inner board 32 are mounted securely on the metal rods 24 and serve respectively as an outer surface and an inner surface of the outer wall. The boards 30, 32 may be made of calcium silicate or concrete. The thickness of each board 30, 32 may be 9 to 12 millimeters (mm).

In addition, the frame 10 may further comprise a side board 34 disposed securely on a side of the frame 10 to form a side surface of the outer wall. The side board 34 is mounted securely on the metal rods 24 and may be made of calcium silicate or concrete. The thickness of the side board 34 may be 9 to 12 millimeters (mm).

The coating layer 40 is coated on at least one of the surfaces of the frame 10 and is composed of a glass-fiber net 42 and an adhesive material layer 44. The coating layer 40 is coated on the outer board 30, the inner board 32 and the side board 34. The adhesive material layer 44 is composed of 32% to 36% acrylic resin, 48% to 52% Hydroxyethyl Cellulose (HEC), and 11% to 15% water by weight. The proportion of the ingredients of the adhesive material layer 44 may be changed based on different demands.

With such an arrangement, the frame 10 has a hollow structure, so the weight of the outer wall can be effectively reduced. In addition, the frame 10 can be made of pre-painted hot-dip zinc-coated steel sheet or coil, so the cost for manufacturing the outer wall can be effectively reduced. With the arrangement of the adhesive material layer 44, the outer wall has a water-proof effect, is not electrically conductive, and has an excellent weatherability and an antistatic ability.

Figure 3:
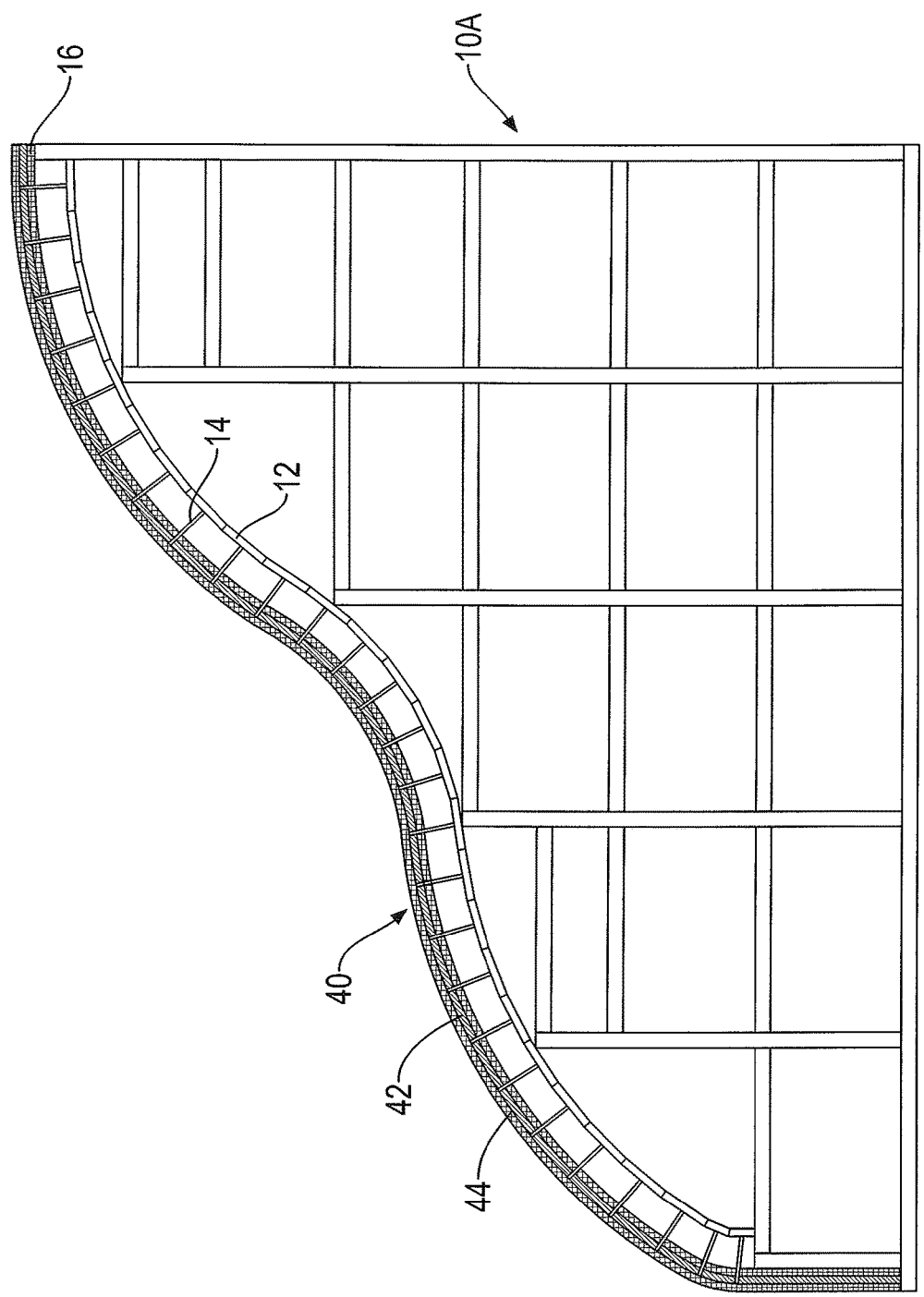
FIG. 3 is a side view in partial section of a second embodiment of an outer wall of a building in accordance with the present invention.
Figure 4:
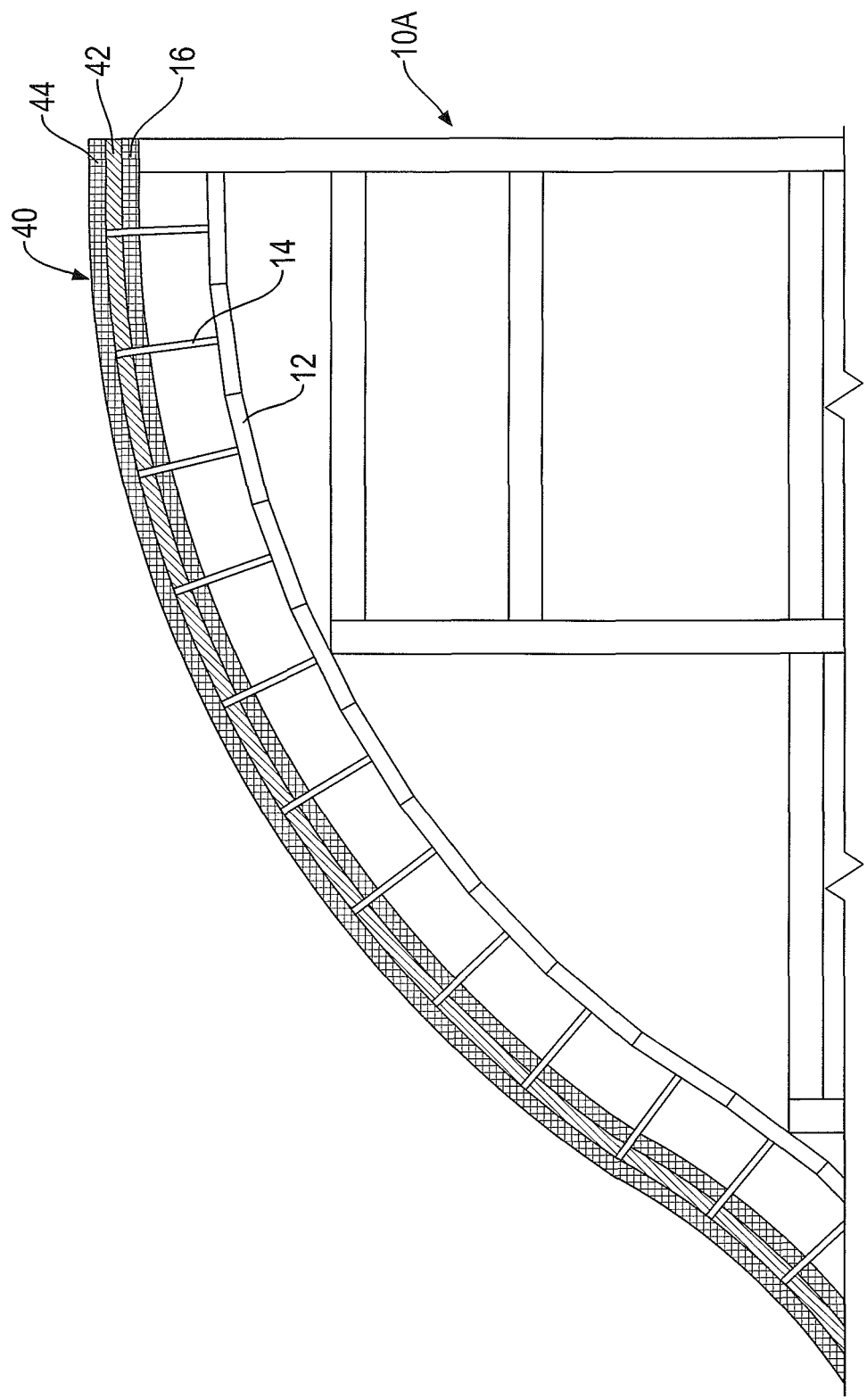
FIG. 4 is an enlarged side view in partial section of the outer wall in FIG. 3.

With reference to FIGS. 3 and 4, in a second embodiment, the frame 10A comprises a wall board 12, multiple metal fixing rods 14, and a metal net 16. The wall board 12 is disposed on one of the surfaces of the frame 10A and is composed of multiple metal sheets. The metal fixing rods 14 are mounted on and protrude from the wall board 12, and each metal fixing rod 14 has a distal end away from the wall board 12. The metal net 16 is mounted on the distal ends of the metal fixing rods 14 and has a side opposite the wall board 12. The coating layer 40 is coated on the side of the metal net 16. The coating layer 40 has a structure which is the same as that in the first embodiment and is composed of a glass-fiber net 42 and an adhesive material layer 44 that is composed of acrylic resin, Hydroxyethyl Cellulose (HEC), and water. The proportion of the ingredients of the adhesive material layer 44 may be changed based on different demands.

With such an arrangement, a curved and non-flat outer wall can be formed, and the appearance of a building is variable to fit with different needs for different buildings.

Figure 5:
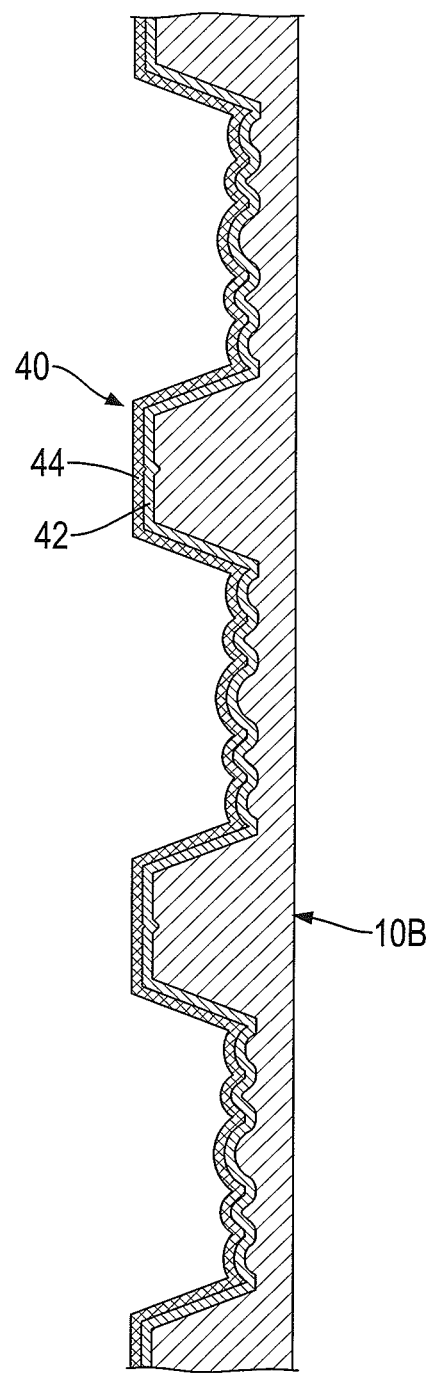
FIG. 5 is a cross sectional side view of a third embodiment of an outer wall of a building in accordance with the present invention.

With reference to FIG. 5, in the third embodiment, the frame 10B comprises a board body having multiple protrusions formed on and protruding from a side of the board body. The coating layer 40 is coated on the side of the board body having the protrusions. The coating layer 40 has a structure which is the same as that in the first embodiment and is composed of a glass-fiber net 42 and an adhesive material layer 44 that is composed of acrylic resin, Hydroxyethyl Cellulose (HEC), and water. The proportion of the ingredients of the adhesive material layer 44 may be changed based on different demands. Accordingly, a different outer wall having a different appearance is provided to fit with different needs of different buildings.

The outer wall of a building in accordance with the present invention has the following advantages.

1. The weight of an outer wall of a building can be effectively reduced, and the cost for building a building can be effectively reduced because the outer wall is easily constructed.

2. The coating layer 40 in accordance with the present invention has excellent water-proof and heat-insulating effects, excellent weatherability, and an antistatic effect. When the coating layer 40 is coated on a steel paint metal wave board, the temperature at an outer surface of the wave board may be reduced by 15 to 20° C.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An outer wall of a building comprising:
a frame having multiple surfaces; and
a coating layer coated on at least one of the surfaces of the frame and being composed of a glass-fiber net and an adhesive material layer, wherein the adhesive material layer is composed of acrylic resin, Hydroxyethyl Cellulose (HEC), and water, wherein the adhesive material layer is composed of 32% to 36% acrylic resin, 48% to 52% Hydroxyethyl Cellulose (HEC), and 11% to 15% water by weight.

2. The outer wall as claimed in claim 1, wherein:
the frame comprises multiple metal members to form an outer wall surface and an inner wall surface, an outer board mounted on the outer wall surface, and an inner board mounted on the inner wall surface;
each metal member comprises a steel member and multiple metal rods; and
the coating layer is coated on the outer board and the inner board.

3. The outer wall as claimed in claim 2, wherein:
the frame further has a side board; and
the coating layer is coated on the outer board, the inner board, and the side board.

4. The outer wall as claimed in claim 1, wherein:
the frame comprises:
a wall board disposed on one of the surfaces of the frame and composed of multiple metal sheets;
multiple metal fixing rods mounted on and protruding from the wall board and each having a distal end away from the wall board; and
a metal net mounted on the distal ends of the metal fixing rods and having a side opposite the wall board; and
the coating layer is coated on the side of the metal net opposite the wall board.

5. The outer wall as claimed in claim 1, wherein:
the frame comprises a board body having multiple protrusions formed on and protruding from a side of the board body; and
the coating layer is coated on the side of the board body having the protrusions.

\* \* \* \* \*